US00RE38890E

(19) United States
(12) Reissued Patent
Jung

(10) Patent Number: US RE38,890 E
(45) Date of Reissued Patent: Nov. 22, 2005

(54) DEVICE FOR CONVERTING DATA USING LOOK-UP TABLES

(75) Inventor: Lee-wha Jung, SeoDong Osan (KR)

(73) Assignee: Samsung Electronics Co., Ltd., Kyungki-do (KR)

(21) Appl. No.: 09/457,848

(22) Filed: Dec. 9, 1999

Related U.S. Patent Documents

Reissue of:
(64) Patent No.: 5,696,941
Issued: Dec. 9, 1997
Appl. No.: 08/382,208
Filed: Feb. 1, 1995

(30) Foreign Application Priority Data

Feb. 2, 1994 (KR) ..... 94-1919

(51) Int. Cl.[7] ..... G06F 3/00; G09G 5/00
(52) U.S. Cl. ..... 710/3; 345/203; 345/501; 345/515; 345/516; 345/199; 348/651; 348/654; 358/468; 358/471; 358/447; 358/451
(58) Field of Search ..... 710/3; 345/203, 345/515, 501, 516, 199, 505, 509, 197; 348/651, 654, 403, 514; 358/468, 471, 447, 451, 455, 404; 711/1, 211; 341/65, 67; 382/300

(56) References Cited

U.S. PATENT DOCUMENTS 4,528,693 A * 7/1985 Pearson et al. ..... 382/299
4,688,095 A * 8/1987 Beg et al. ..... 348/671
4,719,503 A * 1/1988 Craver et al. ..... 348/717
4,751,446 A * 6/1988 Pineda et al. ..... 345/199
4,833,531 A * 5/1989 Abe et al. ..... 382/300
4,849,745 A * 7/1989 Satou ..... 345/191
4,910,685 A * 3/1990 Imsand et al. ..... 345/22
5,109,348 A * 4/1992 Pfeiffer et al. ..... 345/505
5,235,432 A * 8/1993 Creedon et al. ..... 358/479
5,249,267 A * 9/1993 Osaki ..... 345/515
5,343,335 A * 8/1994 Hara ..... 360/45
5,387,985 A * 2/1995 Loce et al. ..... 358/447
5,402,181 A * 3/1995 Jenison ..... 348/651
5,426,468 A * 6/1995 Jenison ..... 348/654
5,696,941 A * 12/1997 Jung ..... 710/3

* cited by examiner

*Primary Examiner*—Jacques H. Louis-Jacques
(74) *Attorney, Agent, or Firm*—Sughrue Mion, PLLC

(57) ABSTRACT

A data converting device for converting data by employing a plurality of LUTs stored in a single memory device. The device generates, with reference to two or more LUTs sequentially, a converted output data corresponding to input data and converting level selected by each LUT. The data converting device has a single memory device for storing two or more LUTs corresponding to the number of data converting modes by block units, each block including a plurality of sub-LUTs corresponding to the number of converting levels defined in each corresponding converting mode. The device also has an address generator for generating an address for accessing the memory device by an input data, by the data selected among the output data read from the memory device and by the data for selecting a converting level in each converting mode, the address being generated repeatedly a number of times which corresponds to the number of LUTs stored in the memory device, to thereby minimize the bulk of the memory device, and thus enable the miniaturization of the data converting device.

4 Claims, 6 Drawing Sheets

FIG. 2A (PRIOR ART)

| |
|---|
| 256 BYTES(CONDITION 1: 0) |
| 256 BYTES(CONDITION 1: 1) |
| 256 BYTES(CONDITION 1: 2) |
| 256 BYTES(CONDITION 1: 3) |
| ⋮ |

FIG. 2B (PRIOR ART)

| |
|---|
| 256 BYTES(CONDITION 2: 0) |
| 256 BYTES(CONDITION 2: 1) |
| 256 BYTES(CONDITION 2: 2) |
| 256 BYTES(CONDITION 2: 3) |
| ⋮ |

FIG. 2C (PRIOR ART)

| |
|---|
| 256 BYTES(CONDITION 3: 0) |
| 256 BYTES(CONDITION 3: 1) |
| 256 BYTES(CONDITION 3: 2) |
| 256 BYTES(CONDITION 3: 3) |
| ⋮ |

DATA 1
DATA 2

0
1
2
3
0
1

INPUT DATA
LUT1 OUT
LUT2 OUT
LUT3 OUT
INPUT DATA

COND.1 DATA
COND.2 DATA
COND.3 DATA
COND.1 DATA

DEVICE FOR CONVERTING DATA USING LOOK-UP TABLES

Matter enclosed in heavy brackets [ ] appears in the original patent but forms no part of this reissue specification; matter printed in italics indicates the additions made by reissue.

BACKGROUND OF THE INVENTION

The present invention relates to a data converting device for converting input data such as image data or voice data according to a user's request, and more particularly, to a data converting device for converting data by employing a multitude of look-up-tables (LUTs) composed of converting data corresponding to input data.

In the conventional image output apparatus such as a color printer or facsimile, when image quality is compensated for brightness, contrast or tint by employing LUTs, an LUT for compensating each image characteristic, defined by each compensation mode, has to be stored in a discrete ROM. For example, when image quality is compensated by three kinds of compensation modes, three memory devices are needed for storing three kinds of LUTs.

FIG. 1 is a block diagram showing a data converting device using LUTs in a conventional color printer. First, second and third ROMs 12, 14 and 16 are memory devices for storing LUT data for each converting mode. First, second and third latches 11, 13 and 15 latch the data input to each latch so as to output the latched data in accordance with a clock signal. First and second delays 17 and 18 generate a delayed clock signal for controlling latches 13 and 15 connected to the output of ROMs 12 and 14 respectively.

When input data 101 is input periodically, first latch 11 latches input data 101 and outputs the latched data to first ROM 12 in accordance with clock signal 110. Output data 102 from first latch 11 serves as a lower address of first ROM 12. First condition data 107 determines a converting level with respect to the LUT stored in first ROM 12 and serves as an upper address of first ROM 12. That is, an address for accessing first ROM 12 consists of a lower address, i.e., output data 102 of first latch 11, and an upper address, i.e., first condition data 107. Data 103 output from first ROM 12 is data which is converted by a first LUT according to input data 101 and first condition data 107.

A first delay 17 delays clock signal 110 by a time period equal to the time delay between the input and output of first ROM 12 and generates the delayed clock signal 111 to be output to second latch 13. Second latch 13 connected to an output of first ROM 12 outputs to second ROM 14 the latched data 103 output from first ROM 12 according to the delayed clock signal 111. An address for accessing second ROM 14 consists of a lower address, i.e., output data 104 of second latch 13, and an upper address, i.e., second condition data 108. Data 105 output from second ROM 14 is data which is secondly converted by a second LUT according to second condition data 108 and data 104 which is firstly converted by the first LUT.

Second delay 18, third latch 15 and third ROM 16 operate as described above. Then, the data 113 thirdly converted by a third LUT of third ROM 16 according to the secondly converted data 106 and third condition data 109 is finally output.

The relationship between first, second and third condition data 107, 108 and 109 and the LUTs stored in first, second and third ROMs 12, 14 and 16 can be explained as follows. First condition data 107 determines a conversion level with respect to the converting mode of the first LUT and is generally given by a user. For example, if input data is 8-bit image data, the first LUT stored in first ROM 12 is for controlling the brightness level of an image, and the brightness level can be controlled by four steps, the number of input data is $2^8$=256, that is, from 0 to 255. The first LUT consists of 256 byte (256×8 bits) data by steps, and the first condition data consists of 2-bit data for representing the four steps.

FIG. 2A to FIG. 2C illustrate the data structure of the ROM employed for the conventional data converting device. Each LUT can compensate data in accordance with four steps in each converting mode, and the memory capacity of each ROM is divided into four regions, and converting data in accordance with each step is stored in each divided region.

As described above, the conventional data converting device connects in series a number of ROMs equal to the number of the required LUTs and sequentially reads LUT data stored in each ROM, to thereby perform a data conversion. In general, a plurality of devices included in the peripheral control circuitry of ROMs can be miniaturized into a single chip such as an application specific integrated circuit (ASIC), but ROMs for storing LUTs are not included in an ASIC, in consideration of any necessary modification of ROM contents.

Accordingly, device miniaturization is restricted and the volume of the required hardware and manufacturing cost are increased since memory devices are needed in accordance with the number of LUTs according to the kinds of converting modes.

SUMMARY OF THE INVENTION

Accordingly, it is an object of the present invention to provide a data converting device for storing a multitude of LUTs in a single memory device to convert data.

To accomplish the above object, there is provided a data converting device for generating, with reference to two or more LUTs sequentially, a converted output data corresponding to input data and converting level selected by each LUT, the data converting device comprising:

a single memory device for storing two or more LUTs corresponding to the number of data converting modes by block units, each block including a plurality of sub-LUTs corresponding to the number of converting levels defined in each corresponding converting mode; and an address generator for generating an address for accessing the memory device by an input data, the data selected among the output data read from the memory device and the data for selecting converting level in each converting mode, the address being generated repeatedly a number of times corresponding to the number of LUTs stored in the memory device.

BRIEF DESCRIPTION OF THE DRAWINGS

The above objects and other advantages of the present invention will become more apparent by describing in detail a preferred embodiment thereof with reference to the attached drawings in which:

FIG. 2A to FIG. 2C are data structure diagrams of the ROMs shown in FIG. 1;

DETAILED DESCRIPTION OF THE INVENTION

Figure 1:
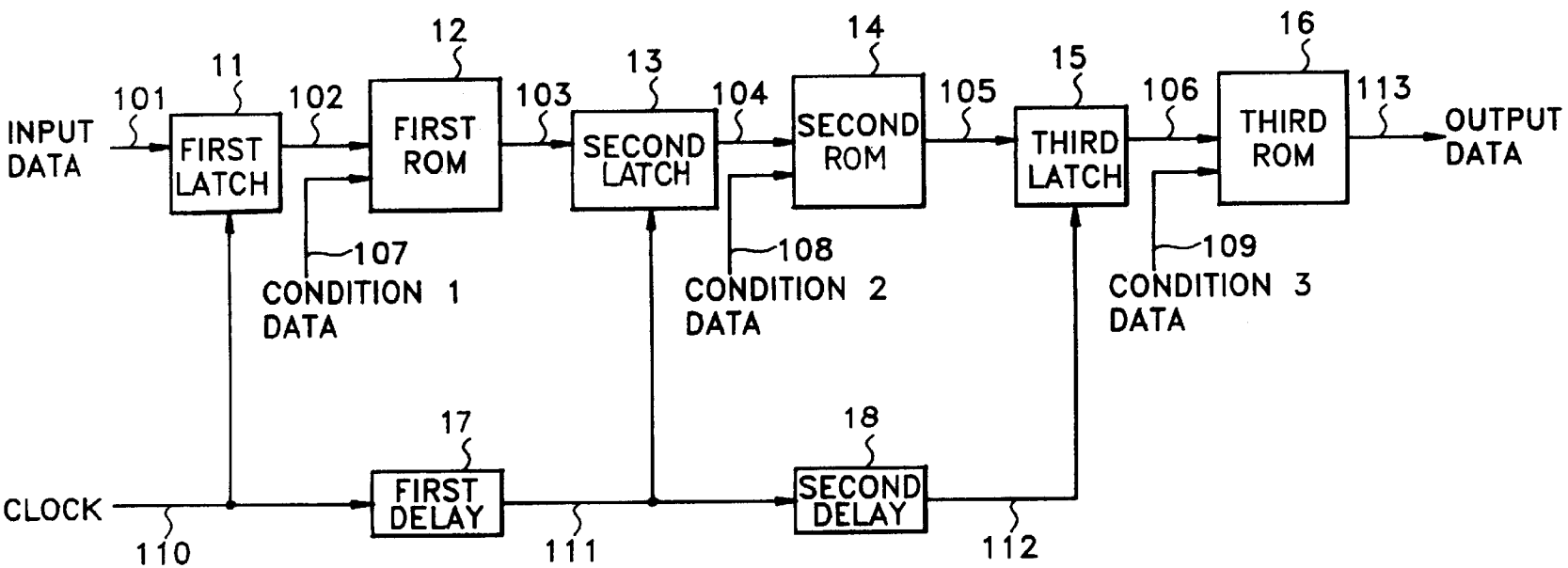
FIG. 1 (PRIOR ART)
FIG. 1 is a block diagram showing the constitution of the conventional data converting device.
Figure 3:
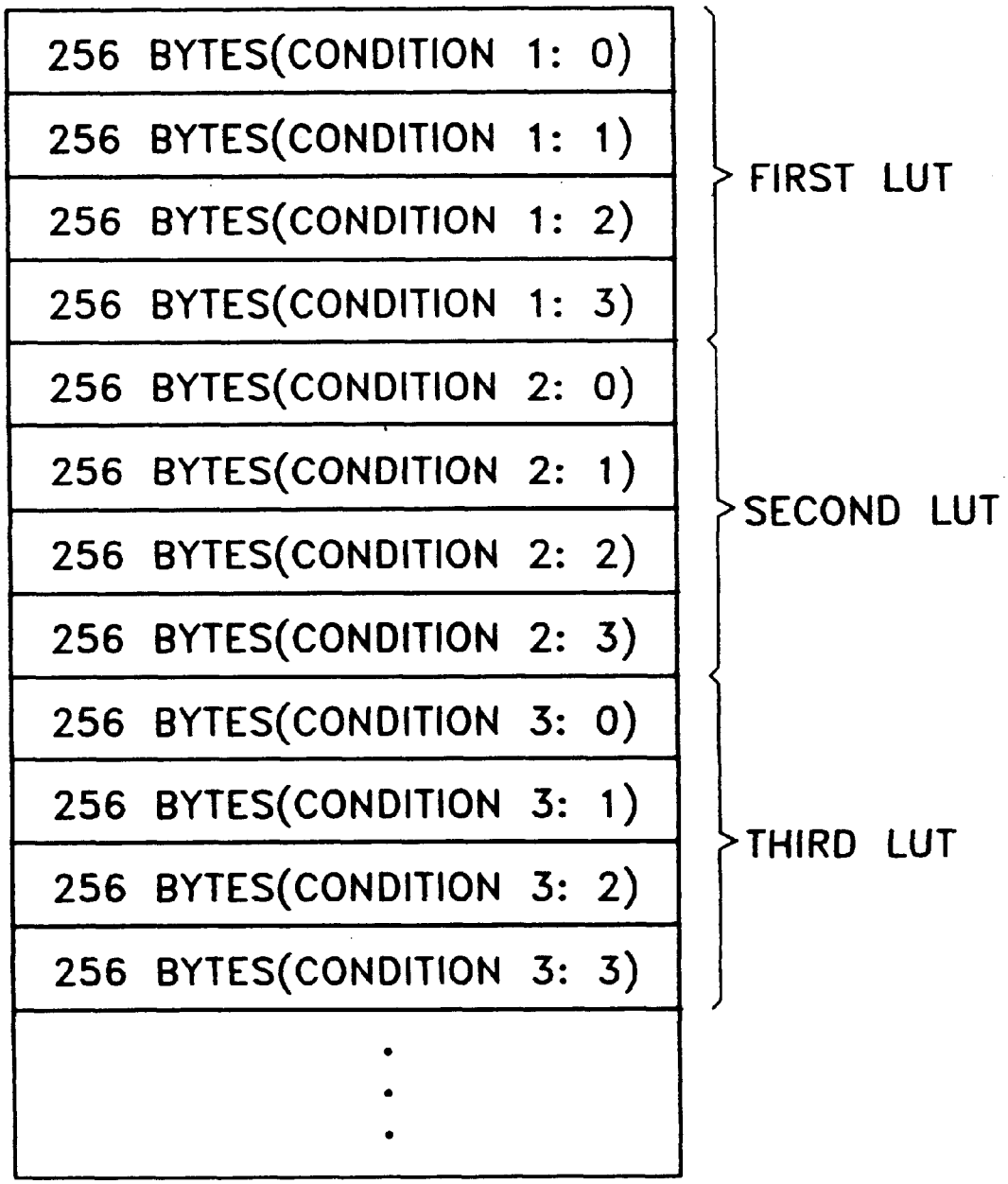
FIG. 3 is a data structure diagram of a ROM applied to the present invention.

FIG. 3 is a data structure diagram of a ROM applied to the present invention.

The entire memory capacity of a memory device is divided into blocks corresponding to the number of LUTs required for the kinds of converting modes, and a memory capacity of each divided block is divided into sub-blocks corresponding to the number of conversion levels of the corresponding LUT. Converting data is stored in the divided blocks and sub-blocks according to the corresponding converting mode and conversion level.

An embodiment of the present invention governs the case where the input data is image data consisting of eight bits, and each LUT is defined by a converting mode (for example, brightness, contrast, etc.) for controlling image quality, and the image quality can be controlled by four conversion levels in each converting mode.

In applying the present invention, if the number of bits of input data, the kinds of converting modes and the number of conversion levels are different from those of the embodiment of the present invention, the memory capacity of the blocks and the sub-blocks of a memory device can be divided appropriately. In addition, if the memory capacity occupied by each LUT is different, the memory blocks for each LUT can be divided into equal capacities or can be variably divided for an efficient use of memory capacity. For the latter case, a problem in data accessing caused by a variable constitution of memory capacity has to be considered.

In addition, LUT data stored in a memory device includes various converting data required for the apparatus to which the present invention is applied, for example, audio or temperature compensation data as well as image compensation data.

Figure 4:
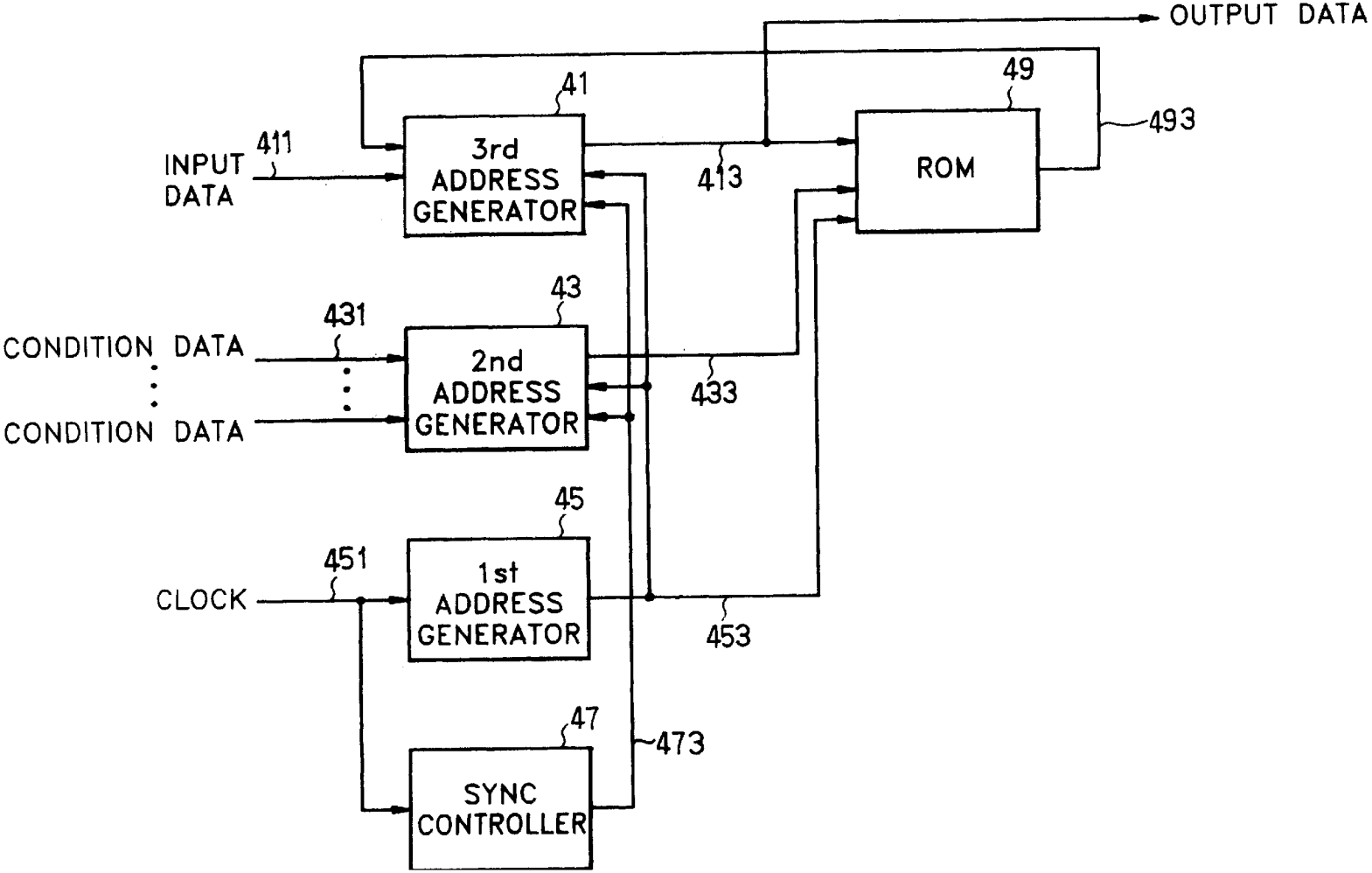
FIG. 4 is a block diagram of a data converting device of the present invention.

FIG. 4 is a block diagram of a data converting device of the present invention. The data converting device comprises a ROM 49 for storing a plurality of LUTs in the format shown in FIG. 3, a first address generator 45 for generating a first address 453 for sequentially selecting an LUT according to a converting mode, a second address generator 43 for generating a second address 433 for selecting a sub-block in the LUT selected by first address 453 according to a conversion level, a third address generator 41 for generating a third address 413 for selecting converting data in the sub-block selected by first and second addresses 453 and 433, and a sync controller 47 for generating a sync signal 473 for synchronizing first, second and third addresses 453, 433 and 413 input to ROM 49.

A clock signal 451 is a pulse signal whose period equals the time interval between the input of single input data 411 and the output of the data finally converted by all LUTs stored in ROM 49. Clock signal 451 is synchronized with input data 411 and input to first address generator 45 and sync controller 47 to thereby synchronize addresses 453, 433 and 413 for accessing ROM 49.

First address generator 45 receives clock signal 451 and generates first address 453 for sequentially selecting the desired LUT stored in ROM 49. Second address generator 43 generates, according to condition data 431 for determining a conversion level defined for each LUT, second address 433 for selecting a sub-block within the LUT selected by first address 453. Third address generator 41 receives input data 411 and feedback output data 493 and generates third address 413 for selecting converting data within the selected sub-block. In other words, input data 411 is generated as third address 413 when data is converted by the first LUT, and the feedback output data 493 is generated as third address 413 for other cases. Accordingly, an address for accessing the data of ROM 49 has the order of first, second and third addresses 453, 433 and 413.

Figure 5:
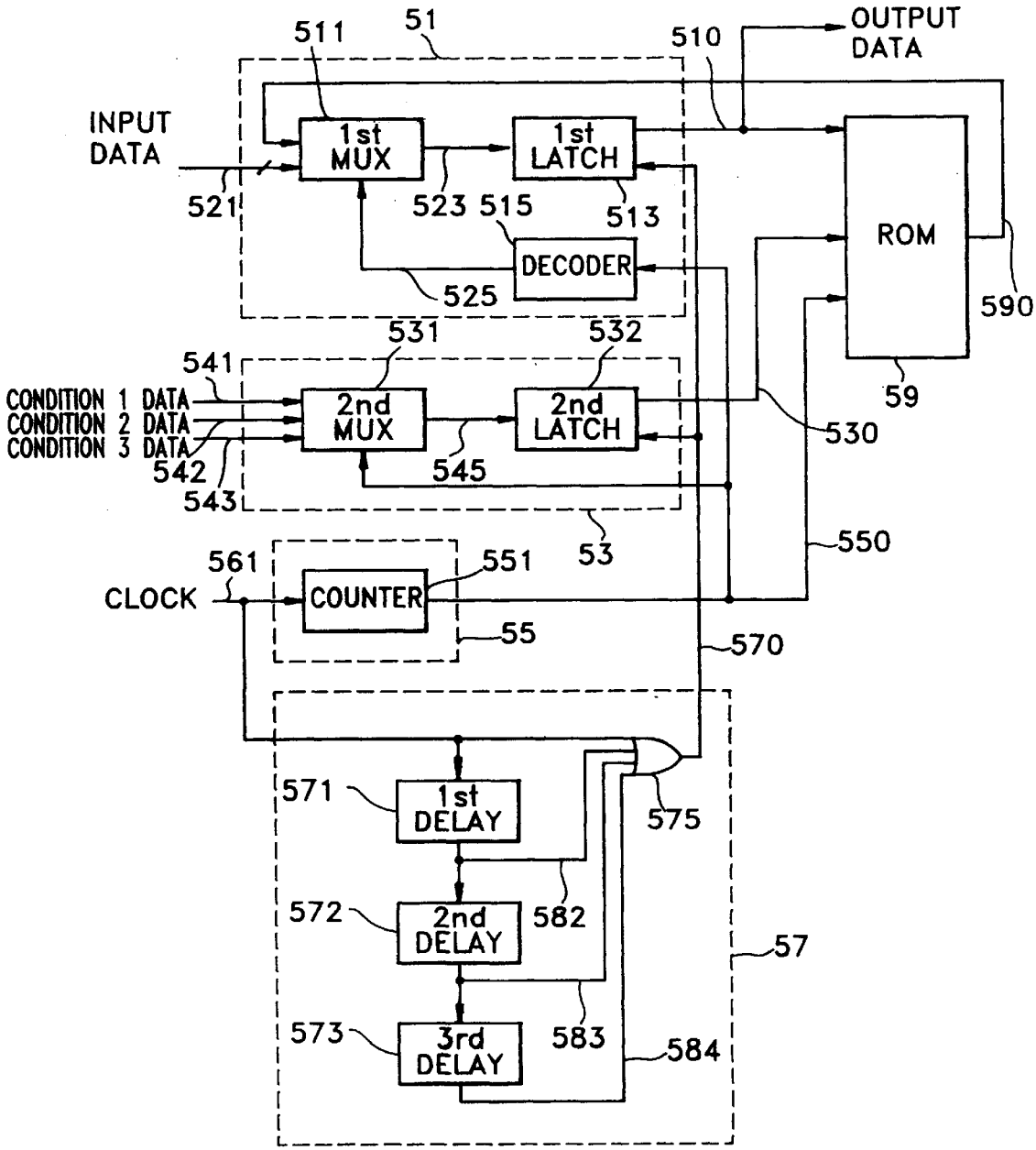
FIG. 5 is a detailed block diagram of the data converting device shown in FIG. 4.

FIG. 5 is a detailed block diagram of the data converting device shown in FIG. 4. This embodiment is for the case where three LUTs are stored in ROM 59.

A first address generator 51 comprises a counter 551 for generating four pulses during one cycle of the input clock signal 561. The generated signal 550 is output to ROM 59, a second MUX 531 and a decoder 515.

A second address generator 53 comprises a second MUX 531 having a three-to-one multiplexer for selecting and outputting one among three types of condition data 541, 542 and 543 according to pulse signal 550 input from counter 551 and a second latch 532 for latching data 545 output from second MUX 531 and outputting the latched data to ROM 59 according to sync signal 570.

A third address generator 51 comprises a decoder 515 for generating the signal 525 for controlling first MUX511 according to pulse signal 550 input from counter 551, a first MUX 511 made up of a two-to-one multiplexer where input data 521 and the feedback output data 590 are input for selecting and outputting one of the input signals 521 and 590 according to control signal 525 generated from decoder 515, and a first latch 513 for latching data 523 output from first MUX 511 and outputting the latched data to ROM 59 according to sync signal 570.

A sync controller 57 comprises first, second and third delays 571, 572 and 573 for outputting clock signal 561 which is delayed by a delay time determined by the data access time of ROM 59, and an OR gate 575 for performing a logical OR operation on clock signal 561 and the delayed signals 582, 583 and 584 and thereby generating sync signal 570. The generated sync signal 570 is input to second latch 532 of second address generator 53 and first latch 513 of third address generator 51.

FIG. 6A to FIG. 6I illustrate the operational timing of the data converting device shown in FIG. 5. Operation of the device will be explained according to a time sequence and with reference to the reference numerals of FIG. 5.

Figures 6A, 6B, 6C, 6D, 6E, 6F, 6G, 6H, 6I:
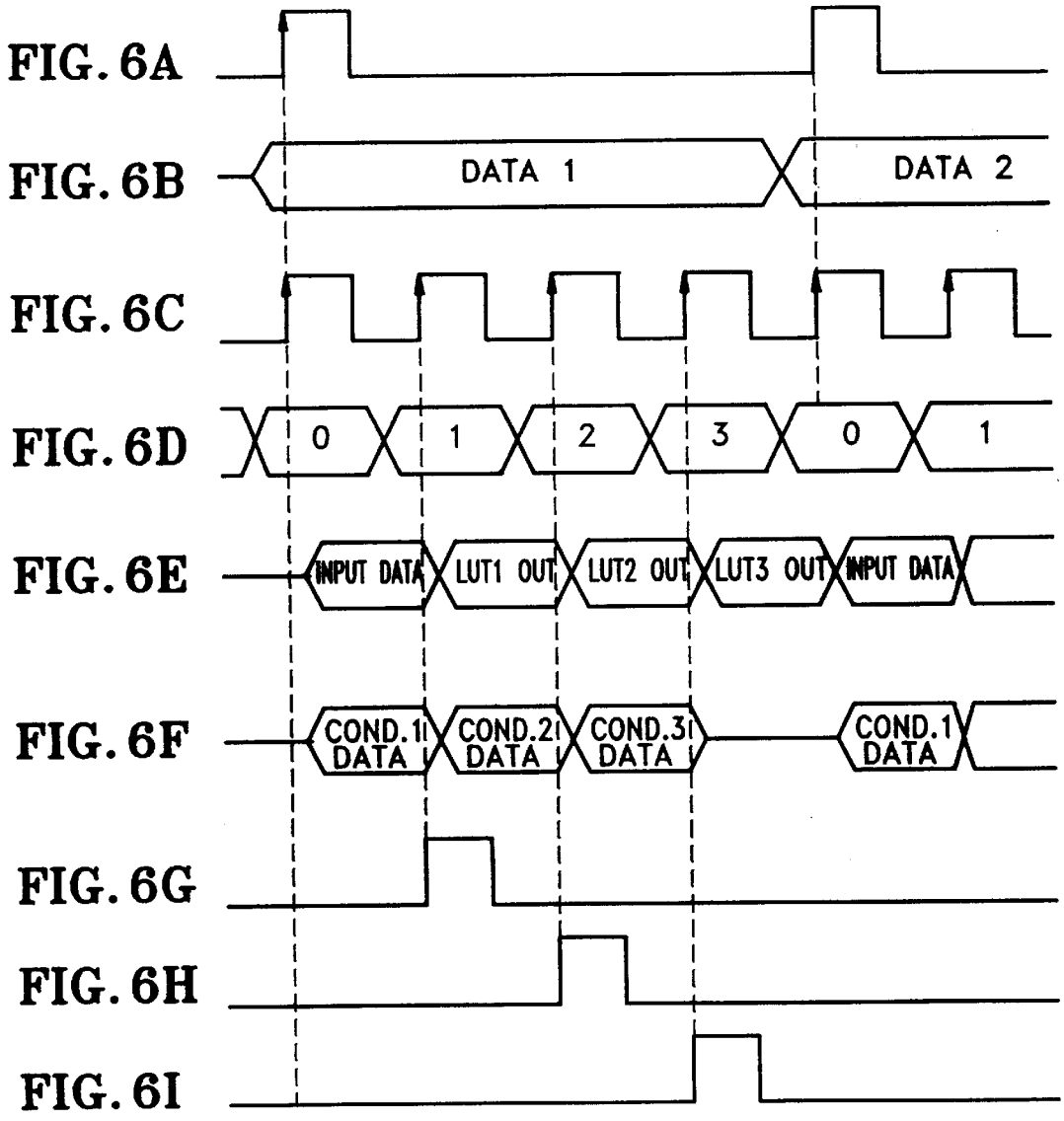
FIG. 6A to FIG. 6I are timing diagrams for illustrating the operation of the data converting device shown in FIG. 5.

FIG. 6A illustrates a waveform of clock signal 561, 6B illustrates a waveform of input data signal 521, 6C illustrates a waveform of sync signal 570, 6D illustrates a waveform of first address signal 550 output from counter 551, 6E illustrates a waveform of third address signal 510 output from first latch 513, 6F illustrates a waveform of second address signal 530 output from second latch 532, 6G illustrates a waveform of output signal 582 of first delay 571, 6H illustrates a waveform of output signal 583 of second delay 572, and 6I illustrates a waveform of output signal 584 of third delay 573.

Sync signal 570 is generated by performing a logical OR operation on clock signal 561 and the first, second and third delay signals 582, 583 and 584 which are delayed by a predetermined time with respect to clock signal 561. Four pulses are generated during one cycle of input data signal 521 and are employed for synchronization with addresses input to ROM 59.

Operation during a first cycle of sync signal 570 can be explained as follows. Counter 551 outputs first address signal 550 for accessing the first LUT of ROM 59 according to the clock signal. Second MUX 531 selects first condition data 541 with respect to a conversion level of the first LUT and outputs the selected data to second latch 532. The latched data is output as second address signal 530 for addressing ROM 59. Decoder 515 generates a control signal that makes first MUX 511 select input data 521, and first MUX 511 selects input data 521 according to the control signal of decoder 515 and outputs the result to first latch 513, and the latched data is output as third address signal 510 for accessing ROM 59. Accordingly, data of the first LUT of ROM 59 is accessed by the first, second and third address signals 550, 530 and 510, and the input data is converted by the first LUT and the first-converted data is fed back and is input to first MUX 511.

Operation during a second cycle of sync signal 570 can be explained as follows. Counter 551 outputs first address signal 550 for accessing the second LUT of ROM 59 according to the clock signal. Second MUX 531 selects second condition data 541 with respect to a conversion level of the second LUT and outputs the selected data to second latch 532. The latched data is output as second address signal 530 for accessing ROM 59. Decoder 515 generates a control signal that makes first MUX 511 select the feedback first-converted data 590, and first MUX 511 selects the feedback first-converted data 590 according to the control signal of decoder 515 and outputs the result to first latch 513, and the latched data is output as third address signal 510 for accessing ROM 59. Accordingly, data of the second LUT of ROM 59 is accessed by the first, second and third address signals 550, 530 and 510, and the feedback first-converted data is converted by the second LUT and the second-converted data is fed back and is input to first MUX 511.

Operation during a third cycle of sync signal 570 is the same as that during the second cycle of the sync signal. Data of a third LUT of ROM 59 is accessed by first, second and third address signals 550, 530 and 510, and the feedback second-converting data is converted by the third LUT and the third-converted data is fed back and is input to first MUX 511.

During a fourth cycle of the sync signal, first MUX 511 selects the feedback third-converted data 590 and outputs the selected data to first latch 513. The latched data is output as finally converted data 510.

According to the present invention, input data is sequentially converted by all LUTs during one clock cycle, to thereby generate final output data. Accordingly, when the number of LUTs for data conversion is increased, output data is fed back so as to convert data through all LUTs. Therefore, the clock cycle is increased in proportion to the delay time of the ROM. However, such a problem can be solved by reducing the access time of the ROM.

As described above, a plurality of LUTs are stored in a single memory device and a data converting device adopting the same is provided, so that the data converting device can be miniaturized by reducing the bulk of the memory device.

What is claimed is:

1. A data converting device for generating output data converted corresponding to input data and a conversion level selected by look-up-tables (LUTs) with sequential reference to three or more LUTs, said data converting device comprising:

a single memory device for storing at least three LUTs corresponding to a number of data converting modes by block units, each of said block units including a plurality of sub-LUTs corresponding to a number of conversion levels defined in each corresponding conversion mode; and an address generator for generating a series of addresses for accessing said memory device, a first address of said series of addresses being determined according to first conversion level data and input data, each address of said series of addresses following said first address being determined using corresponding conversion level data and data read out from one of said LUTs using a next previous address of said series of addresses, the number of addresses in said series being equal to the number of LUTs stored in said memory device, wherein a final address of said series of addresses indicates a location in said memory device where final output data is stored.

2. A data converting device according to claim 1, wherein said address generator comprises:

a first address generator for generating a first portion of each of said series of addresses to sequentially select an LUT stored in said memory device;

a second address generator for generating a second portion of each of said series of addresses to select a sub-LUT corresponding to the conversion level selected in the converting mode for said selected LUT;

a third address generator for receiving the output data read from said memory device, and for generating a third portion of each of said series of addresses for selecting converting data corresponding to said input data when said input data is converted according to a first converting mode and for selecting converting data corresponding to the output data read from said memory device when said input data is converted according to a converting mode which is other than said first converting mode; and a sync signal generator for synchronizing said generated first, second and third addresses so as to access data in said memory device.

*3. A data converting device for generating output data converted corresponding to input data and a conversion level selected by look-up-tables (LUTs) with sequential reference to two or more LUTs, said data converting device comprising:*

*a single memory device for storing at least two LUTs corresponding to a number of data converting modes by block units, each of said block units including a plurality of sub-LUTs corresponding to a number of conversion levels defined in each corresponding conversion mode; and*

*an address generator for generating a series of addresses for accessing said memory device, a first address of said series of addresses being determined according to first conversion level data and input data, each address of said series of addresses following said first address being determined using corresponding conversion level data and data read out from one of said LUTs using a next previous address of said series of addresses, the number of addresses in said series being less than or equal to the number of LUTs stored in said memory device, wherein a final address of said series of addresses indicates a location in said memory device where final output data is stored.*

*4. A data converting device according to claim 3, wherein said address generator comprises:*

*a first address generator for generating a first portion of each of said series of addresses to sequentially select an LUT stored in said memory device;*

*a second address generator for generating a second portion of each of said series of addresses to select a sub-LUT corresponding to the conversion level selected in the converting mode for said selected LUT;*

*a third address generator for receiving the output data read from said memory device, and for generating a third portion of each of said series of addresses for selecting converting data corresponding to said input data when said input data is converted according to a first converting mode and for selecting converting data corresponding to the output data read from said memory device when said input data is converted according to a converting mode which is other than said first converting mode; and*

*a sync signal generator for synchronizing said generated first, second and third addresses so as to access data in said memory device.*

* * * * *